United States Patent
Jahnke et al.

(10) Patent No.: US 10,465,305 B2
(45) Date of Patent: Nov. 5, 2019

(54) HYDROGEN AND CARBON MONOXIDE GENERATION USING AN REP WITH PARTIAL OXIDATION

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 71 days.

(21) Appl. No.: 15/980,356

(22) Filed: May 15, 2018

(65) Prior Publication Data

US 2018/0261862 A1    Sep. 13, 2018

Related U.S. Application Data (63) Continuation of application No. PCT/US2016/062276, filed on Nov. 16, 2016.
(Continued)

(51) Int. Cl.
*C25B 15/08* (2006.01)
*H01M 8/04007* (2016.01)
(Continued)

(52) U.S. Cl.
CPC ............... *C25B 15/08* (2013.01); *C25B 1/04* (2013.01); *H01M 2/12* (2013.01);
(Continued)

(58) Field of Classification Search
CPC ......... H01M 8/0618; C25B 1/10; C25B 15/08
See application file for complete search history.

(56) References Cited

U.S. PATENT DOCUMENTS 3,094,390 A    6/1963   Vander
4,849,091 A    7/1989   Cabrera et al.
(Continued)

FOREIGN PATENT DOCUMENTS

CA    1242985 A    8/1985
CA    2937948 A    8/2015
(Continued)

OTHER PUBLICATIONS

International Search Report and Written Opinion in PCT/US/16/62276, dated Jan. 31, 2017 (8 pages).
(Continued)

*Primary Examiner* — Nicholas A Smith
(74) *Attorney, Agent, or Firm* — Foley & Lardner LLP (57) ABSTRACT

A system for producing at least one of hydrogen or carbon monoxide includes at least one fuel cell, including an anode and a cathode separated by an electrolyte matrix. The at least one fuel cell further includes a power supply for applying a reverse voltage to the at least one fuel cell to operate the fuel cell in reverse as an electrolyzer. The anode is configured to receive a partially-reformed fuel and output a gas comprising hydrogen. The cathode is configured to output a gas comprising carbon dioxide and oxygen. The system further includes at least one oxidizer configured to receive the carbon dioxide and oxygen from the cathode and fuel from a fuel supply, the at least one oxidizer configured to output a partially-oxidized fuel comprising carbon monoxide, carbon dioxide, and hydrogen.

28 Claims, 5 Drawing Sheets

Related U.S. Application Data (60) Provisional application No. 62/256,515, filed on Nov. 17, 2015.

(51) Int. Cl.
    *C25B 1/04*     (2006.01)
    *H01M 8/0612*     (2016.01)
    *H01M 2/12*     (2006.01)
    *H01M 8/14*     (2006.01)

(52) U.S. Cl.
    CPC ..... *H01M 8/04007* (2013.01); *H01M 8/0618* (2013.01); *H01M 8/14* (2013.01); *H01M 2008/147* (2013.01); *H01M 2300/0051* (2013.01)

(56) References Cited

U.S. PATENT DOCUMENTS

| | | |
|---|---|---|
| 5,071,719 A | 12/1991 | Rostrup-Nielsen et al. |
| 5,346,613 A | 9/1994 | Lomas et al. |
| 5,413,878 A | 5/1995 | Williams et al. |
| 5,711,770 A | 1/1998 | Malina |
| 6,187,465 B1 | 2/2001 | Galloway |
| 7,070,874 B2 | 7/2006 | Blanchet et al. |
| 7,323,270 B2 | 1/2008 | Patel et al. |
| 7,353,085 B2 | 4/2008 | Rusta-Sallehy et al. |
| 7,396,603 B2 | 7/2008 | Farooque et al. |
| 9,478,819 B2 | 10/2016 | Lambrech et al. |
| 2002/0004154 A1 | 1/2002 | Pastula et al. |
| 2004/0180249 A1* | 9/2004 | Pham ............... C25B 15/04 429/411 |
| 2005/0058863 A1 | 3/2005 | Wang et al. |
| 2005/0112425 A1 | 5/2005 | Hsu |
| 2005/0123810 A1 | 6/2005 | Balan |
| 2005/0197743 A1 | 9/2005 | Rusta-Sallehy et al. |
| 2005/0271914 A1 | 12/2005 | Farooque et al. |
| 2006/0140823 A1 | 6/2006 | Katikaneni et al. |
| 2006/0248800 A1 | 11/2006 | Miglin et al. |
| 2008/0060935 A1 | 3/2008 | Hartvigsen |
| 2008/0075990 A1 | 3/2008 | Isozaki et al. |
| 2008/0155984 A1 | 7/2008 | Liu et al. |
| 2008/0314741 A1 | 12/2008 | Balestrino et al. |
| 2009/0110989 A1 | 4/2009 | Daly et al. |
| 2009/0158662 A1 | 6/2009 | Towler |
| 2009/0226775 A1 | 9/2009 | Jahnke et al. |
| 2009/0235587 A1 | 9/2009 | Hawkes et al. |
| 2010/0047641 A1 | 2/2010 | Jahnke et al. |
| 2010/0304228 A1 | 12/2010 | Majarov et al. |
| 2011/0104577 A1 | 5/2011 | Cui et al. |
| 2011/0189567 A1 | 8/2011 | Venkataraman et al. |
| 2013/0052548 A1 | 2/2013 | Nedergaard Clausen et al. |
| 2013/0108936 A1 | 5/2013 | McElroy et al. |
| 2013/0126038 A1 | 5/2013 | Jamal et al. |
| 2013/0177824 A1 | 7/2013 | Cui et al. |
| 2013/0251598 A1 | 9/2013 | Gil et al. |
| 2013/0260268 A1 | 10/2013 | Shapiro et al. |
| 2014/0076213 A1 | 3/2014 | Ingram et al. |
| 2014/0080076 A1 | 3/2014 | Lutz |
| 2014/0093798 A1 | 4/2014 | Snyder et al. |
| 2014/0272626 A1 | 9/2014 | Berlowitz et al. |
| 2014/0272629 A1 | 9/2014 | Berlowitz et al. |
| 2015/0280265 A1 | 10/2015 | McLarty |
| 2016/0351930 A1 | 12/2016 | Jahnke et al. |

FOREIGN PATENT DOCUMENTS

| | | |
|---|---|---|
| CN | 101427408 A | 5/2009 |
| CN | 104847424 A | 8/2015 |
| CN | 106133973 A | 11/2016 |
| DE | 10 2012 206 541 A1 | 10/2013 |
| EP | 2 784 187 A1 | 10/2014 |
| EP | 3 054 519 A1 | 8/2016 |
| JP | 51-008405 A | 1/1976 |
| JP | 60-235893 | 11/1985 |
| JP | 06-005301 A | 1/1994 |
| JP | 11-169661 A | 6/1999 |
| JP | 11-223475 A | 8/1999 |
| JP | 2002-319428 | 10/2002 |
| JP | 2004-099927 A | 4/2004 |
| JP | 2004-311159 A | 11/2004 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |
| JP | 2005-293934 A | 10/2015 |
| JP | 6096790 B2 | 3/2017 |
| JP | 2017-511956 | 4/2017 |
| KR | 1020070057131 A | 6/2007 |
| KR | 20110114816 | 10/2011 |
| KR | 1020160114632 A | 10/2016 |
| WO | WO-01/04045 | 1/2001 |
| WO | WO-2007/015689 A2 | 2/2007 |
| WO | WO-2009/031747 A1 | 3/2009 |
| WO | WO-2013/029701 A1 | 3/2013 |
| WO | WO-2015/116964 A1 | 8/2015 |
| WO | WO-2017/087405 A1 | 5/2017 |

OTHER PUBLICATIONS

Caprile et al.; Carbon capture: Energy wasting technologies or the MCFCs challenge? International Journal of Hydrogen Energy; 2011 ;36:10269-77.

Desideri et al.; MCFC-based CO2 capture system for small scale CHP plants. International Journal of Hydrogen Energy. 2012;37: 19295-303.

Extended European Search Report dated Oct. 26, 2018 for EP18182210.7 (8 pages).

Extended European Search Report in EP 15744017.3 dated Aug. 16, 2017 (12 pages).

Extended European Search Report received in EP18182124.0 dated Dec. 7, 2018 (6 pages).

Heidenbrecht et al., Molten Carbonate Fuel Cell (MCFC) with Internal Reforming: model-based analysis of cell dynamics, Chemical Engineering Science, vol. 58, issues 3-6, 2003, pp. 1029-1036.

International Preliminary Report on Patentability dated May 22, 2018 for PCT/US2016/062069 (6 pages).

International Preliminary Report on Patentability for PCT/US2017/030230 dated Oct. 30, 2018 (6 pages).

International Preliminary Report on Patentability issued in corresponding application No. PCT/US2015/013837 dated Aug. 2, 2016.

International Search Report and Written Opinion dated May 6, 2014 in PCT/US2015/013837 (13 pages).

International Search Report and Written Opinion dated Jul. 19, 2017 for PCT/US17/28321 (16 pages).

International Search Report and Written Opinion dated Jul. 26, 2017 in PCT/US17/30230 (13 pages).

International Search Report and Written Opinion for PCT/US16/61981 dated Jan. 19, 2017 (8 pages).

International Search Report and Written Opinion in PCT/US16/62069 dated Jan. 27, 2017 (10 pages).

International Search Report and Written Opinion on PCT/US16/62083, dated Jan. 31, 2017, 8 pages.

Kasai, "CO2 Electrochemical Separation by Molten Carbonate Technology," Fuel Chemistry Division Preprints, 2002, 47(1), 69-70.

Non-Final Office Action on U.S. Appl. No. 15/115,186 dated Dec. 31, 2018 (7 pages).

Notice of Preliminary Rejection for KR Appl. No. 10-2018-7017810 dated Nov. 12, 2018, with English translation (13 pages).

Notification of the First Office Action for CN201580009634.6 dated May 4, 2018, with English translation (15 pages).

Office Action in JP 2018-116336 dated Sep. 21, 2018, with English translation (7 pages).

(56) References Cited

OTHER PUBLICATIONS

Office Action in JP 2018-525361 dated Sep. 21, 2018, with English translation (6 pages).
Office Action issued in JP 2016-549225, dated Sep. 25, 2017, with English translation (9 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages).
Second Office Action issued in CA2937948 dated Jun. 11, 2018 (4 pages).
Extended European Search Report in EP16866931 dated May 2, 2019 (10 pages).
Extended European Search Report in EP16867038.8 dated Jun. 27, 2019 (8 pages).
Extended European Search Report on EP16866959.6 dated May 3, 2019 (10 pages).
Extended European Search Report received in EP16866965.3, dated Jun. 17, 2019 (7 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
International Search Report and Written Opinion in PCT/IB2018/058968 dated Jan. 23, 2019 (16 pages).
International Search Report and Written Opinion in PCT/IB2018/059191 dated Mar. 27, 2019 (20 pages).
Office Action in JP2018-116336 dated Mar. 26, 2019 with English translation (8 pages).
Office Action in JP2018-525557 dated May 24, 2019, with English translation (14 pages).
U.S. Notice of Allowance on U.S. Appl. No. 15/980,305 dated Feb. 14, 2019.

* cited by examiner

HYDROGEN AND CARBON MONOXIDE GENERATION USING AN REP WITH PARTIAL OXIDATION

CROSS-REFERENCE TO RELATED PATENT APPLICATIONS

The present application is a Continuation of International Application No. PCT/US2016/062276, filed Nov. 16, 2016, which claims the benefit of and priority to U.S. Provisional Patent Application No. 62/256,515, filed Nov. 17, 2015. The entire disclosures of International Application No. PCT/US2016/062276 and U.S. Provisional Patent Application No. 62/256,515 are incorporated herein by reference.

STATEMENT OF GOVERNMENT RIGHTS

This invention was made with Government support under Cooperative Agreement DE-EE0006669 awarded by the United States Department of Energy. The Government has certain rights in the invention.

BACKGROUND

The present application relates generally to the field of $H_2$ ("hydrogen") and/or CO ("carbon monoxide") generation using fuel cells with partial oxidation.

A reformer-electrolyzer-purifier ("REP") may be used to generate hydrogen and/or carbon monoxide. Examples of REPs and systems that include them are described in PCT Publication No. WO 2015/116964, which is assigned to the assignee of the present application.

SUMMARY

In one embodiment, a system for producing at least one of hydrogen or carbon monoxide includes at least one fuel cell, including an anode and a cathode separated by an electrolyte matrix. The at least one fuel cell further includes a power supply for applying a reverse voltage to the at least one fuel cell to operate the fuel cell in reverse as an electrolyzer. The anode is configured to receive a partially-reformed fuel and output a gas comprising hydrogen. The cathode is configured to output a gas comprising carbon dioxide and oxygen. The system further includes at least one oxidizer configured to receive the carbon dioxide and oxygen from the cathode and fuel from a fuel supply, the at least one oxidizer configured to output a partially-oxidized fuel comprising carbon monoxide, carbon dioxide, and hydrogen.

In one aspect of the system, the system further includes a heat source configured to generate heat and exhaust.

In one aspect of the system, the heat source is a fired heater.

In one aspect of the system, the system further includes a reformer configured to receive fuel from the fuel supply and at least one of steam or water.

In one aspect of the system, the reformer is configured to transfer heat from the heat source to the fuel and to the at least one of steam or water, and the reformer is configured to at least partially reform the fuel and at least one of steam or water.

In one aspect of the system, the system further includes a pre-heater configured to pre-heat the fuel before the fuel is received in the reformer.

In one aspect of the system, the pre-heater is configured to pre-heat the fuel using waste heat.

In one aspect of the system, the system further includes an air supply heat exchanger configured to transfer heat generated by the heat source to air received by the heat source.

In one aspect of the system, the heat source is configured to vent exhaust out of the system.

In another embodiment, a method of generating at least one of hydrogen or carbon monoxide using the system includes receiving, at the anode of the fuel cell, partially-reformed fuel and at least one of steam or water, and outputting hydrogen from the anode of the fuel cell. The method further includes outputting carbon dioxide and oxygen from the cathode of the fuel cell. The method further includes receiving, at the at least one oxidizer, carbon dioxide and oxygen from the cathode and fuel from the fuel source. The method further includes outputting carbon monoxide from the at least one oxidizer.

In one aspect of the method, the method further includes venting exhaust generated by the heat source after heat is transferred from the exhaust by at least one of a reformer or a heat exchanger.

In one aspect of the method, the method further includes transferring heat from exhaust generated by the heat source to the fuel in at least one of a reformer or a heat exchanger.

In one aspect of the method, the method further includes transferring heat from exhaust generated by the heat source to at least one of steam or water in at least one of a reformer or a heat exchanger.

In one aspect of the method, the method further includes mixing hydrogen output from the anode of the fuel cell and carbon monoxide output from the at least one oxidizer to form a syngas.

In one aspect of the method, the method further includes desulfurizing the fuel prior to feeding the fuel to a reformer.

In another embodiment, a system for producing at least one of hydrogen or carbon monoxide includes at least one fuel cell, including an anode and a cathode separated by an electrolyte matrix, and a power supply for applying a reverse voltage to the at least one fuel cell to operate the fuel cell in reverse as an electrolyzer. The at least one fuel cell further includes a reforming cell configured to receive fuel from a fuel supply and at least one of steam or water, the reforming cell configured to output a partially-reformed fuel. The reforming cell is configured to feed the partially-reformed fuel to the anode and the cathode. The anode is configured to receive the partially-reformed fuel and output a gas comprising hydrogen. The cathode is configured to receive and at least partially oxidize at least one of the fuel from the fuel supply or the partially-reformed fuel. The cathode is configured to output carbon monoxide, hydrogen, and carbon dioxide.

In one aspect of the system, the cathode further includes a catalyst configured to partially oxidize the partially-reformed fuel.

In one aspect of the system, the cathode is configured to output primarily carbon monoxide.

In one aspect of the system, the system further includes a heat source configured to generate heat and exhaust.

In one aspect of the system, the system further includes a first heat exchanger configured to transfer heat from the heat source to fuel from the fuel supply and at least one of steam or water.

In one aspect of the system, the heat source is a fired heater.

In one aspect of the system, the heat source is configured to vent exhaust out of the system.

In one aspect of the system, the system further includes a pre-reformer configured to receive fuel from the fuel supply and at least one of steam or water.

In one aspect of the system, the system further includes a pre-heater configured to pre-heat the fuel before the fuel is received in the reforming cell.

In one aspect of the system, the pre-heater is configured to pre-heat the fuel using waste heat.

In one aspect of the system, the fuel from the fuel supply is methane.

In another embodiment, a method of generating at least one of hydrogen or carbon monoxide with the system includes receiving, at the reforming cell, methane and steam, and outputting a partially-reformed fuel from the reforming cell. The method further includes receiving, at the anode, the partially-reformed fuel from the reforming cell, and outputting hydrogen from the anode. The method further includes receiving, at the cathode, the partially-reformed fuel from the reforming cell, and outputting at least carbon monoxide from the cathode. The method further includes receiving, at the cathode, fuel from the fuel supply and at least one of steam or water.

In one aspect of the method, the method further includes using a reforming reaction in the reforming cell to remove at least a portion of heat generated in an oxidation reaction in the cathode.

In one aspect of the method, the method further includes desulfurizing fuel from the fuel supply prior to feeding the fuel to the reforming cell.

In one aspect of the method, the method further includes mixing hydrogen output from the anode of the fuel cell and carbon monoxide output from the cathode of the fuel cell to form a syngas.

In another embodiment, a system for producing hydrogen includes at least one fuel cell, including an anode and a cathode separated by an electrolyte matrix, and a power supply for applying a reverse voltage to the at least one fuel cell to operate the fuel cell in reverse as an electrolyzer. The system further includes an oxidizer configured to receive fuel from a fuel supply and at least one of steam or water, the oxidizer configured to output a partially-reformed fuel. The anode is configured to receive the partially-reformed fuel from the oxidizer and to output hydrogen. The cathode is configured to output carbon dioxide and oxygen to the oxidizer.

In one aspect of the system, the system further includes a heater configured to heat the fuel and at least one of steam or water.

In one aspect of the system, the heater is configured to receive a portion of the partially-reformed fuel output by the oxidizer.

In one aspect of the system, the heater is configured to combust the partially-reformed fuel to generate heat.

In one aspect of the system, the heater is configured to vent exhaust out of the system.

In one aspect of the system, the fuel is diesel fuel or JP8.

In one aspect of the system, the system further includes a pre-heater configured to pre-heat the fuel and the at least one of steam or water before the fuel and the at least one of steam or water are received in the heater.

In one aspect of the system, the pre-heater is configured to pre-heat the fuel using waste heat.

In another embodiment, a method of generating hydrogen with the system includes receiving, at the oxidizer, fuel and steam, and outputting partially-oxidized fuel from the oxidizer. The method further includes receiving, at the anode, the partially-oxidized fuel, and outputting hydrogen from the anode. The method further includes outputting carbon dioxide and oxygen from the cathode. The method further includes receiving, at the oxidizer, carbon dioxide and oxygen from the cathode.

In one aspect of the method, the method further includes oxidizing fuel and steam from the heater with the carbon dioxide and oxygen output from the cathode.

In one aspect of the method, the method further includes desulfurizing the partially-oxidized fuel prior to feeding the partially-oxidized fuel to the anode.

In one aspect of the method, the method further includes feeding a portion of the partially-oxidized fuel from the oxidizer to a heater configured to heat the fuel and at least one of steam or water.

In one aspect of the method, the method further includes desulfurizing the portion of the partially-oxidized fuel before it is received by the heater.

In one aspect of the method, the method further includes combusting the portion of the partially-oxidized fuel to generate heat in the heater.

In one aspect of the method, the method further includes venting exhaust generated by the heater out of the system.

DETAILED DESCRIPTION

A reformer-electrolyzer-purifier ("REP") assembly includes at least one electrolyzer molten carbonate fuel cell and may include a plurality of electrolyzer fuel cells formed in a fuel cell stack, also referred to as a REP stack. The at least one electrolyzer fuel cell is a fuel cell operated in reverse so as to electrolyze $CO_2$ and water to produce $H_2$ ("hydrogen"), and to purify the hydrogen by removing the $CO_3^=$ electrochemically. The $CO_2$ may be provided by a hydrocarbon, such as methane, and removing the $CO_3^=$ drives the reforming reaction to completion. Other reactions may occur in the at least one electrolyzer fuel cell, as described below and shown in the accompanying Figures.

The REP stack comprises a molten carbonate fuel cell ("MCFC") stack and the REP assembly includes a power supply for supplying power to the REP stack for driving the electrolysis reaction. A controller may be included in the REP assembly and/or in the REP system for controlling the power supply and for controlling other operations and parts of the REP assembly and/or REP system. Control operations are described in more detail below. Although the specification describes the REP assembly, the REP stack and the REP system as including reforming, such as internal or external reforming, it is also contemplated that the REP assembly, the REP stack and/or the REP system may omit internal and/or external reforming, and may be used for electrolyzing a supply gas containing $CO_2$ and water and purifying hydrogen without reforming.

Figure 1:
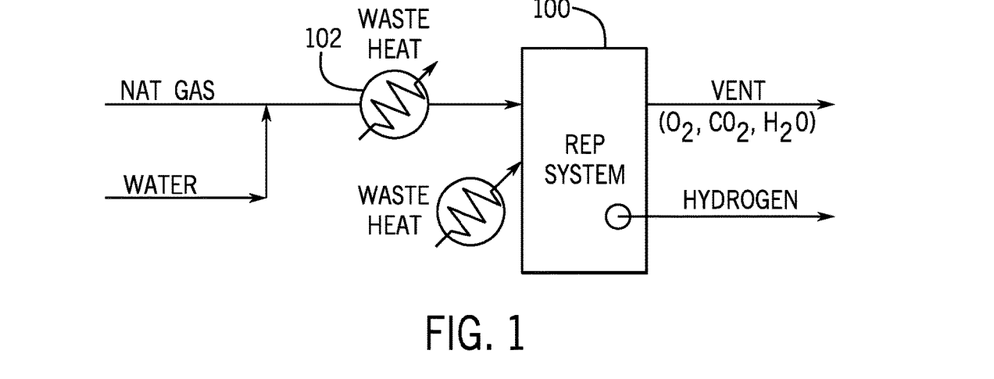
FIG. 1 shows a schematic view of the reformer-electrolyzer-purifier ("REP") system including a REP assembly of the present invention.
Figure 4:
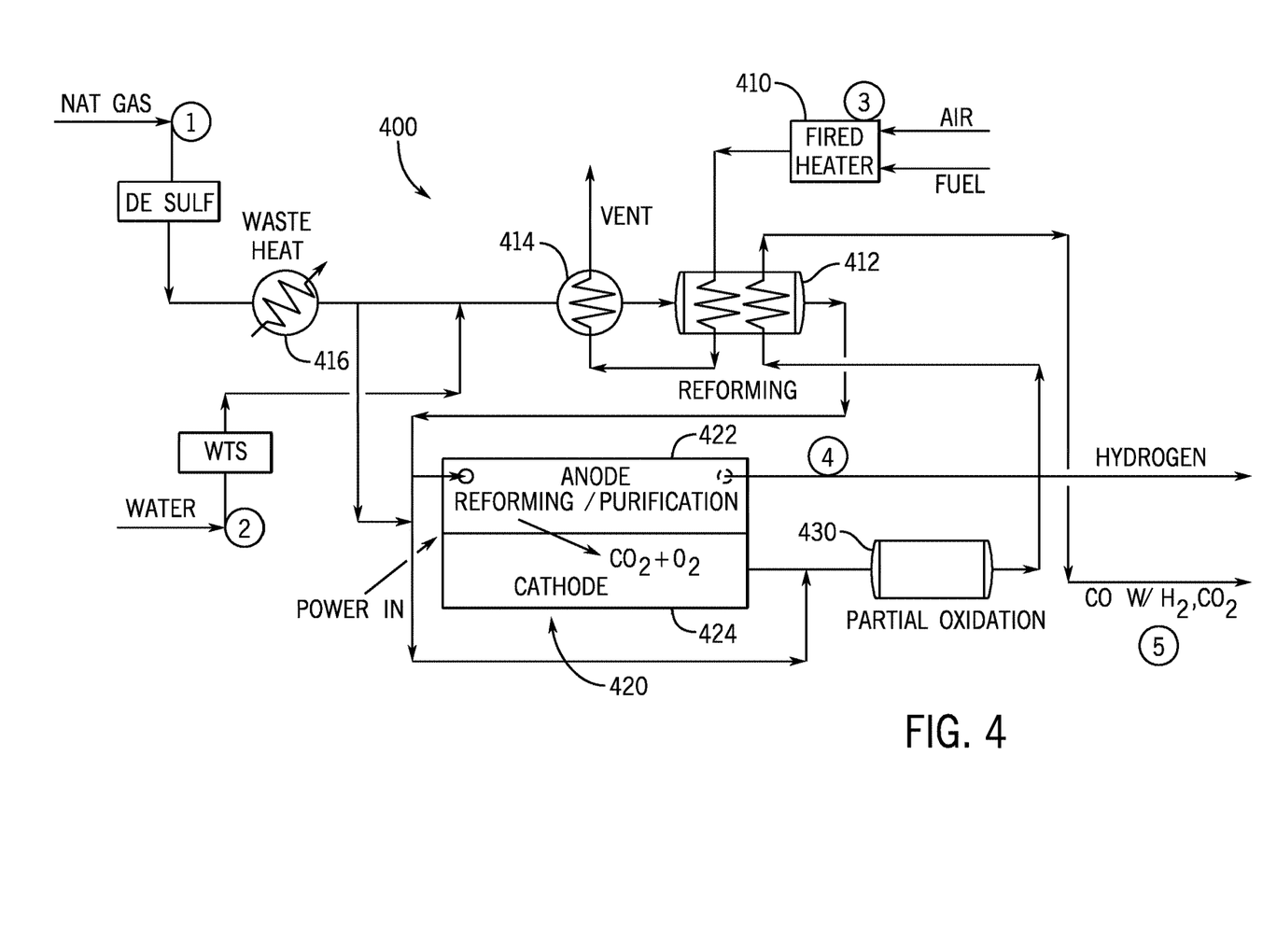
FIG. 4 shows gasification/partial oxidation separate from the REP system.
Figure 5:
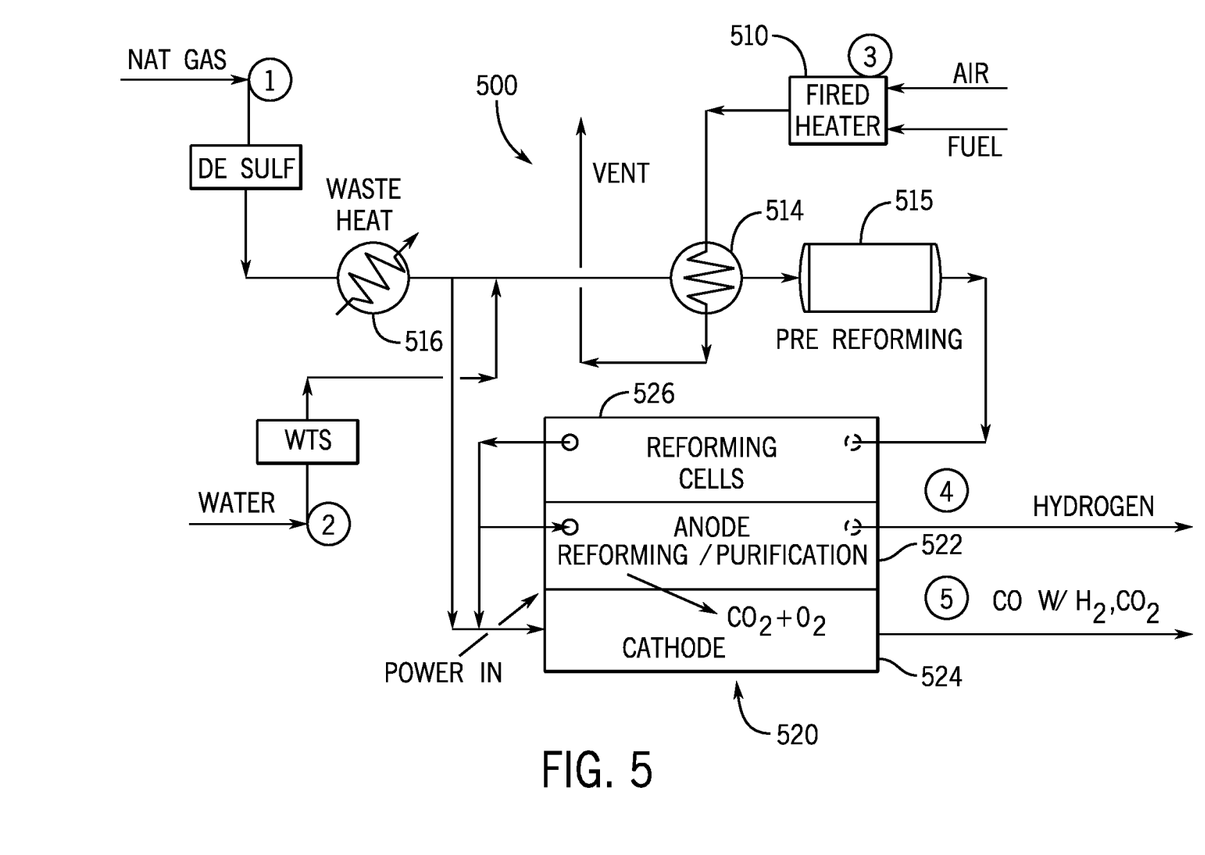
FIG. 5 shows partial oxidation integrated with the REP system.
Figure 6:
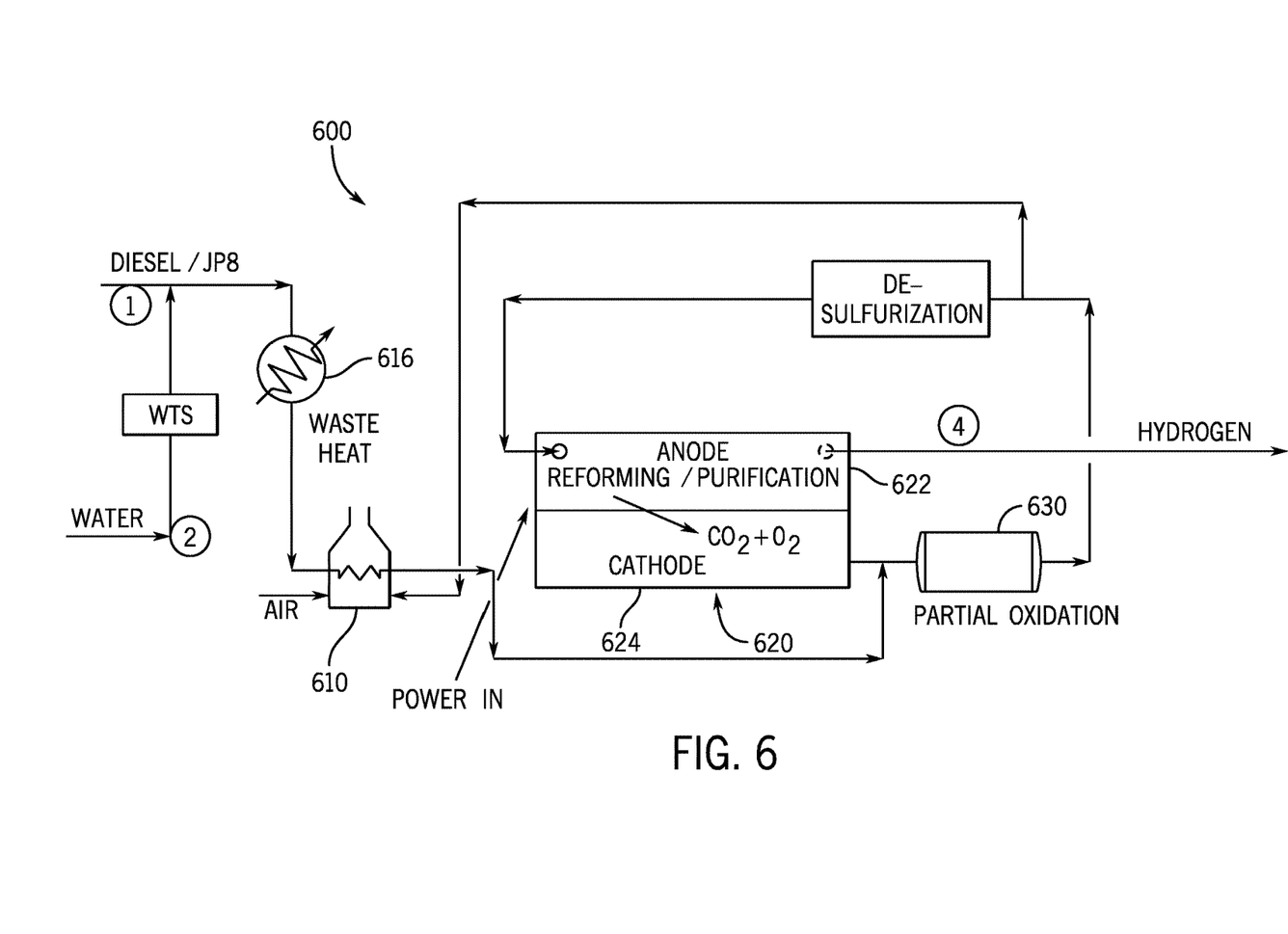
FIG. 6 shows a system for generating hydrogen with low-cost sulfur-containing liquid fuels.

FIG. 1 shows a schematic view of an example of a REP system 100. As shown in FIG. 1, fuel, such as natural gas, anaerobic digester gas ("ADG"), or other suitable fuel, is pre-heated using waste heat (e.g., lower level heat) in a pre-heater 102 (e.g., a primary, first, or waste heat exchanger 416, 516, 616 as shown in FIGS. 4-6, respectively) and thereafter supplied to the REP system 100. The fuel may be humidified or mixed with water before or after being pre-heated. In the REP system 100, the fuel is reformed by reacting with steam to produce hydrogen, CO, and carbon dioxide, and hydrogen is purified at high temperature (reforming temperatures) by separating almost all of the carbon from the hydrogen, which drives the reforming reaction to completion. The REP system 100 outputs hydrogen and separately outputs other reaction products, including oxygen, and carbon dioxide. As shown, high level waste heat is supplied to the REP system 100 to provide heat for the endothermic reforming reaction such that substantially all of the fuel is converted to hydrogen, thereby reducing $CO_2$ emissions resulting from incomplete conversion of methane to hydrogen.

Figure 2:
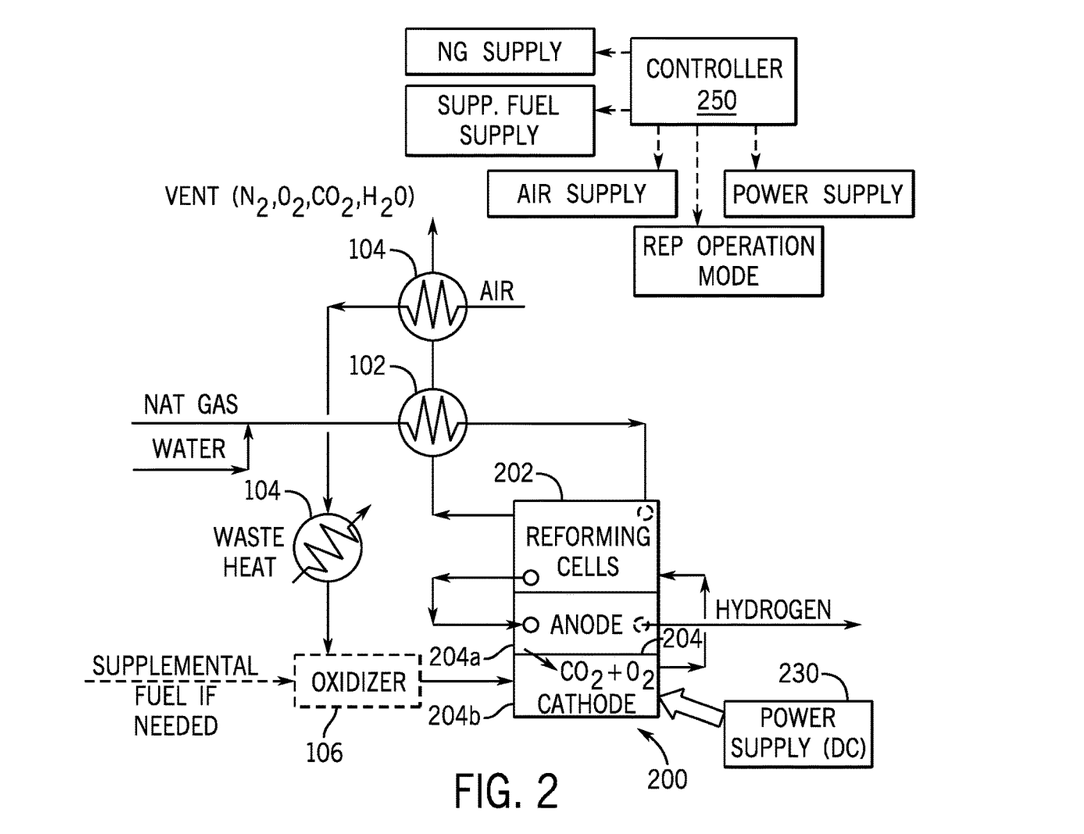
FIG. 2 shows a more detailed view of the REP system.

In one example of a hydrogen and/or carbon monoxide production system, described in PCT Publication No. WO 2015/116964, the hydrogen and/or carbon monoxide production system comprises a REP assembly including a REP stack 200 and a power supply 230. For example, FIG. 2 shows an illustrative configuration of such a hydrogen and/or carbon monoxide production system. The REP stack 200 comprises fuel cell components and may include one or more reforming only cells, or reforming units, 202 and one or more REP fuel cells 204, each of which comprises an anode 204a and a cathode 204b separated by an electrolyte matrix. The REP fuel cells may be configured the same as conventional MCFC fuel cells but are operated in reverse by applying a reverse voltage of greater than 1.0 Volt, typically in the 1.15 to 1.35 Volt range. The reforming-only units 202 and REP fuel cells 204 are assembled in a stack and are connected in series so that fuel is first conveyed through the reforming only cells 202 and thereafter through the anodes 204a of the REP fuel cells 204. The cathodes 204b may receive hot gas, such as air, supplied to the system and a $CO_2$ and $O_2$ gas mixture produced in purification operation from the anode 204a of the REP fuel cell. In one illustrative embodiment, the fuel cell stack 200 of the REP system 100 incorporates components developed for commercial molten carbonate fuel cell technology, such as MCFC/DFC® developed by Fuel Cell Energy, Inc. However, it is understood that other types of molten carbonate fuel cells may be used in the REP system 100.

As also shown in FIG. 2, the REP system 100 may include one or more pre-heaters which utilize waste heat from the cells 204 of the REP system 100 and/or produced by other devices external to the REP system 100 and/or integrated with the REP system 100. The pre-heater 102 uses waste heat from the fuel cells 204 and reforming only cells 202 to preheat fuel, which may be mixed with water or humidified, prior to supplying the fuel to the reforming only cells 202. Other pre-heater(s) 104 may be used for pre-heating gas supplied to the system using waste heat from other devices such as a high temperature fuel cell being used to produce power. Moreover, as shown in FIG. 2, an oxidizer 106 may be provided for increasing the heat to the REP system 100 using supplemental fuel by oxidizing the supplemental fuel with air and generating hot oxidant gas which is then supplied to the REP fuel cell cathodes 204b.

The REP fuel cell stack 200 may be operated in purification mode, or a hydrogen-producing mode, as a purifying-reforming-electrolyzer and during such operation, removes almost all of the carbon from the system as $CO_3^=$ and produces nearly pure hydrogen from the reformed methane. In addition, the REP fuel cell stack 200 also efficiently produces additional hydrogen by dissociation of steam (electrolysis) at the same time. Thus, when natural gas is supplied to the REP system, about 80% of the hydrogen output is produced from the natural gas reformation and the other 20% of the hydrogen is provided by the electrolysis reaction. This REP system 100 produces hydrogen efficiently and with minimal $CO_2$ emissions.

As seen in FIG. 2, fuel, such as natural gas and/or renewable fuel, plus water are fed into the REP system 200. This fuel feed is heated in the pre-heater 102 and then routed to the reforming cells 202 and the REP fuel cells 204 where the almost all of the gas is reformed to hydrogen and CO. Heat for this endothermic reforming reaction may be provided, at least in part, by external waste heat 104, which is provided from other waste heat-generating devices. In certain embodiments, supplemental or extra fuel may be used as a backup or to raise the level of the waste heat, particularly when interruptible renewable waste heat such as wind power or solar heat is used as the source of waste heat. For example, in FIG. 2, an oxidizer 106 is provided in the system which receives supplemental fuel and air and oxidizes the supplemental fuel to produce heated gas for use in the cathode. In this way, the oxidizing reaction raises the level of waste heat that is used in the REP cells.

Figure 3:
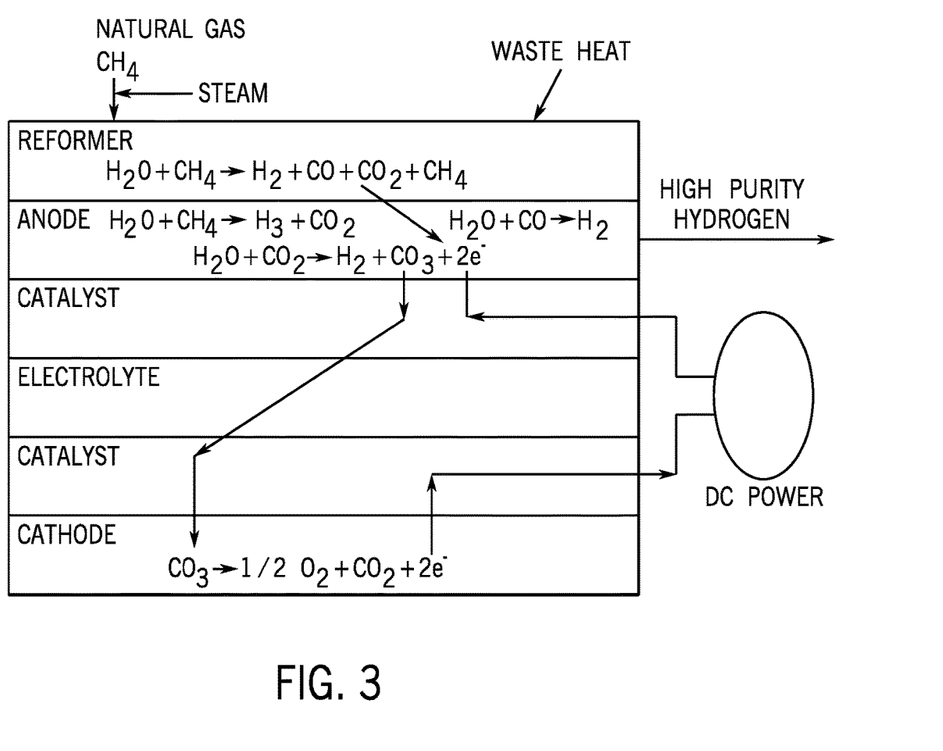
FIG. 3 shows reactions occurring in in the REP assembly.

In the illustrative embodiment shown in FIG. 2, first the fuel gas is partially reformed in the reforming only cells (reformers) 202. The reaction occurring between water and methane in the reformer 202 is shown in FIG. 3. As shown in FIGS. 2 and 3, the partially-reformed gas from the reformer 202 is then fed to the anode side 204a of an MCFC fuel cell 204 operating in purification mode as an electrolyzer (REP cells) (hydrogen producing mode). In the fuel cells 204, water is dissociated to hydrogen and oxygen, the oxygen combines with the carbon dioxide in the reformed gas to produce $CO_3^=$, and the $CO_3^=$ is removed electrochemically across the molten carbonate membrane. These reactions in the anode side 204a of the fuel cell 204 are shown in FIG. 3. This operation in the fuel cell 204 removes almost all of the carbon in the system and forces the equilibrium reforming and shift reactions to essentially complete conversion of the $CH_4$ and CO to hydrogen. Thus, as shown in FIGS. 2 and 3, the exiting hydrogen-containing gas stream is almost pure hydrogen (greater than 98%) with a small amount of $CO_2$ and $CH_4$. This small amount of $CO_2$ and $CH_4$ can easily be removed as the hydrogen is pressurized for systems requiring high purity hydrogen. However, many systems are able to use the low purity hydrogen directly, without the need for removing the small amount of impurities.

As shown in FIG. 2, the operation of the REP fuel cell 204 as an electrolyzer may be controlled by a controller. The controller 250 is programmed to control the supply or flow rate of reactant gases to the REP fuel cell 204. The controller 250 also controls the voltage and current applied to the fuel cell, which is supplied from the power supply (e.g., DC power supply) 230 so that the ion transfer is in the reverse direction of the normal fuel cell operation. The reactions that occur in the fuel cells of the REP system 100 are shown in FIG. 3. When a gas containing $CO_2$ and oxygen is used as the cathode side gas, the controller 250 may further control the switching of the operation modes of the fuel cell 204 between operation as an electrolyzer and normal power production operation.

Moreover, although the reforming cells 202 in FIG. 2 are shown as part of the REP fuel cell stack, so that the stack is an indirect internally reforming stack, in other embodiments, an external reformer may be used instead of or in addition to the internal reforming cells for reforming the fuel.

In certain illustrative embodiments, the components used in the REP system 200 of FIG. 2 are the same or similar to the commercially available components of DFC® fuel cells developed by FuelCell Energy, Inc. By using commercially available components for the REP system, this invention can be rapidly commercialized with competitive costs, which results in further cost savings.

Referring to FIG. 4, an alternative hydrogen and/or carbon monoxide production system is provided for converting natural gas and water to purified hydrogen and carbon monoxide, from which syngas may be formed. Conventionally, syngas is produced by steam methane reforming or by partial oxidation of a hydrocarbon using pure $O_2$ from an air separation unit. Syngas from steam methane reforming generally has a higher $H_2$ to CO ratio than desired and syngas from partial oxidation is not cost effective, except on a very large scale.

Certain embodiments of the present invention overcome these difficulties by using a hydrogen and/or carbon monoxide production system 400 with partial oxidation to generate hydrogen and/or carbon monoxide. Thereafter, hydrogen and carbon monoxide may be mixed to form syngas with a desired $H_2$/CO ratio. The hydrogen and/or carbon monoxide production system 400 includes a heat source 410, a REP assembly 420, a reformer 412 for reforming a fuel feed and a partial oxidizer 430. The REP assembly 420 includes a REP anode 422 and a REP cathode 424.

As shown in FIG. 4, fuel is fed from a fuel supply, desulfurized, and preheated. Water may be added to the fuel before (not shown) or after preheating. Preferably, the fuel is natural gas or other suitable fuel. At least some of the fuel is fed to a partial oxidizer (i.e., oxidizer) 430. Water is converted to steam and mixed with the remaining desulfurized fuel to form a fuel and steam mixture. The fuel and steam mixture is fed through a secondary heat exchanger 414 and a reformer 412. At least some of the fuel and steam mixture is fed to the REP anode 422, and the remaining fuel and steam mixture is fed to the partial oxidizer 430.

The REP anode 422 receives the fuel and steam mixture, which reacts during electrolysis to produce an output gas from the REP anode containing mainly $H_2$. The output gas from the REP anode 422 may be captured and stored or exported. During electrolysis, a stream of at least $CO_2$ and $O_2$ is output from the REP cathode 424 and fed to the partial oxidizer 430.

The partial oxidizer 430 receives and partially oxidizes fuel and the fuel and steam mixture with $CO_2$ and $O_2$. The $CO_2$ and $O_2$ partially oxidize $CH_4$ from fuel from the fuel supply and the fuel and steam mixture to generate a mixture of CO, $H_2$, and $CO_2$ ("syngas"). Preferably, the syngas has a high content of CO. The partial oxidation reaction performed in the partial oxidizer 430 is shown as follows:

$$2CH_4+O_2 \rightarrow 2CO+2H_2 \quad (1)$$

Secondary reactions include a steam reforming reaction (see equation (2)), a $CO_2$ reforming reaction (see equation (3)), and a water-gas shift reaction (see equation (4)).

$$CH_4+2H_2O \rightarrow CO_2+4H_2 \quad (2)$$

$$CH_4+CO_2 \rightarrow 2CO+2H_2+CO_2 \quad (3)$$

$$H_2+CO_2 \leftrightarrow H_2O+CO \quad (4)$$

The syngas is fed from the partial oxidizer 430 through the reformer 412 to provide heat to that system and cool the syngas. The syngas may then be further cooled (not shown), captured, and stored or exported.

A heat source 410 combusts air and fuel to generate high-temperature exhaust. Preferably, the heat source is a fired heater, combustion turbine, internal combustion engine, or other suitable heat source. The high-temperature exhaust is fed through the reformer 412. Heat is transferred in the reformer 412 from the high-temperature exhaust to the feed gas ($CH_4+H_2O$) to partially reform the feed gas. The high-temperature exhaust is further fed through the secondary heat exchanger 414 and vented out of the hydrogen and/or carbon monoxide production system 400. Heat is transferred in the secondary heat exchanger 414 from the high-temperature exhaust to the fuel and steam mixture to preheat the fuel and steam mixture before introduction to the reformer 412 and the REP anode 422.

Referring to FIG. 5, an alternative hydrogen and/or carbon monoxide production system 500 is provided for converting natural gas and water to purified hydrogen and carbon monoxide. The hydrogen and/or carbon monoxide production system 500 includes a heat source 510 and a REP assembly 520. The REP assembly 520 includes a REP anode 522, a REP cathode 524, and at least one reforming cell 526.

As shown in FIG. 5, fuel is first desulfurized, and preheated. Water may be add to the fuel before (not shown) or after preheating. Preferably, the fuel is natural gas or other suitable fuel. At least a portion of the fuel may be fed directly to the REP cathode 524 along with reformed fuel. Water is converted to steam and mixed with the remaining desulfurized fuel to form a fuel and steam mixture. The fuel and steam mixture is fed through a heat exchanger 514 and a pre-reformer 515, where slight reforming of the feed gas occurs, and to the reforming cells 526.

The reforming cells 526 receive the fuel and steam mixture. Heat from the oxidation reaction in the REP cathode 524 is removed by the reforming cells 526 and used in the reforming reaction, which includes a steam reforming reaction (see equation (5)), a $CO_2$ reforming reaction (see equation (6)), and a water-gas shift reaction (see equation (7)).

$$CH_4+2H_2O \rightarrow CO_2+4H_2 \quad (5)$$

$$CH_4+CO_2 \rightarrow 2CO+2H_2+CO_2 \quad (6)$$

$$H_2+CO_2 \leftrightarrow H_2O+CO \quad (7)$$

At least some of the output stream from the reforming cells 526 is fed to the REP anode 522, and the remaining output stream is fed to the REP cathode 524. In the REP anode 522, the output stream from the reforming cells 526 reacts during electrolysis to produce an output gas containing mainly $H_2$. The output gas from the REP anode 522 may be captured and stored or exported. During electrolysis, a stream of at least $CO_2$ and $O_2$ is output from the REP cathode 524. The REP cathode 524 includes a partial oxidation catalyst. The REP cathode 524 receives and partially oxidizes the output stream from the reforming cells 526 in this configuration, with $CO_2$ and $O_2$ to generate syngas. Preferably, the syngas has a high content of CO (i.e., is primarily CO). The partial oxidation reaction performed in the REP cathode 524 is shown as follows:

$$2CH_4+O_2 \rightarrow 2CO+2H_2 \quad (8)$$

Secondary reactions include a steam reforming reaction (see equation (9)), a reforming reaction (see equation (10)), and a water-gas shift reaction (see equation (11)).

$$CH_4+2H_2O \rightarrow CO_2+4H_2 \quad (9)$$

$$CH_4+CO_2 \rightarrow 2CO+2H_2+CO_2 \quad (10)$$

$$H_2+CO_2 \leftrightarrow H_2O+CO \quad (11)$$

The syngas may then be captured and stored or exported. The configuration shown in FIG. 5 has the advantage of eliminating the need for a separate partial oxidation reaction, but since this partial oxidation reaction operates at a lower temperature, it will produce a syngas with lower CO to $H_2$ ratio than that produced in the illustrative embodiment in FIG. 4.

A heat source 510 combusts air and fuel to generate a high temperature exhaust. Preferably, the heat source is a fired heater, combustion turbine, internal combustion engine, or other suitable heat source. The exhaust is fed through the heat exchanger 514. Heat is transferred in the heat exchanger 514 from the exhaust to the fuel and steam mixture to preheat the fuel and steam mixture before introduction to the reforming cells 526. Further, an air supply heat exchanger (not shown) may transfer heat from the heat source to preheat air before introduction to the heat source.

Referring to FIG. 6, an alternative hydrogen production system 600 is provided for converting high-sulfur liquid fuel and water to purified hydrogen. Access to natural gas for operating a fuel cell may be limited in remote locations, but more widely-available fuels, such as those that are high in sulfur (e.g., diesel) may not always be used in place of natural gas when operating a fuel cell that is intolerant of sulfur.

Certain embodiments of the present invention overcome these difficulties by using a hydrogen production system 600 with partial oxidation to generate syngas, removing the sulfur after partial oxidation but before introducing the fuel to the fuel cell. The sulfur-free syngas is then converted to hydrogen in the REP assembly 620. The hydrogen production system 600 includes a high level heater (i.e., heater) 610, a REP assembly 620, and a partial oxidizer (i.e., oxidizer) 630. The REP assembly 620 includes a REP anode 622 and a REP cathode 624.

As shown in FIG. 6, water is converted to steam and mixed with fuel to form a fuel and steam mixture. Preferably, the fuel is diesel, JP8 or other low-cost suitable fuel. The fuel and steam mixture is fed to a low level preheater 616, through a high level heater 610, and then to the partial oxidizer 630.

The partial oxidizer 630 receives and partially oxidizes the fuel and steam mixture with $CO_2$ and $O_2$ generated in the REP cathode 624. The partial oxidation of the fuel and steam mixture converts the sulfur compounds in the feed to $H_2S$ and COS in the syngas. $H_2S$ and COS can be removed from the syngas. The partial oxidation reaction performed in the partial oxidizer 630 is shown as follows:

$$2CH4+O2 \rightarrow 2CO+2H2 \quad (12)$$

Secondary reactions include a steam reforming reaction (see equation (13)) and a reforming reaction (see equation (14)).

$$CH_4+2H_2O \rightarrow CO_2+4H_2 \quad (13)$$

$$CH_4+CO_2 \rightarrow 2CO+2H_2+CO_2 \quad (14)$$

At least some of the syngas mixture is desulfurized, wherein the $H_2S$ and COS is removed from the mixture, and is fed to the REP anode 622. The remaining $H_2S$, COS, and syngas mixture that is not desulfurized is fed to the high level heater 610. According to an exemplary embodiment, desulfurized syngas may also be sent to the heater 610. In either configuration, the stream to the high level heater 610 also prevents $CO_2$ from building up in the hydrogen production system 600.

The REP anode 622 receives the syngas, which reacts during electrolysis to produce an output gas containing mainly $H_2$. The output gas from the REP anode 622 may then be captured and stored or exported. During electrolysis, a stream of at least $CO_2$ and $O_2$ is output from the REP cathode 624 and fed to the partial oxidizer 630.

The remaining $H_2S$, COS, and syngas mixture that is not fed to the REP anode 622 is fed to the high level heater 610. The high level heater 610 combusts air with the $H_2S$, COS, and syngas mixture to generate heat. Heat generated by the combustion in the high level heater 610 is transferred to the fuel and steam mixture. Exhaust generated by the high level heater 610 is vented out of the hydrogen production 600, which prevents the buildup of $CO_2$ within the hydrogen production system 600.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., structures, values of parameters, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is being claimed is:

1. A system for producing at least one of hydrogen or carbon monoxide, comprising:
   at least one fuel cell comprising:
      an anode and a cathode separated by an electrolyte matrix; and
      a power supply for applying a reverse voltage to the at least one fuel cell to operate the fuel cell in reverse as an electrolyzer;
      wherein the anode is configured to receive a partially-reformed fuel and output a gas comprising hydrogen;
      wherein the cathode is configured to output a gas comprising carbon dioxide and oxygen; and
   at least one oxidizer configured to receive the carbon dioxide and oxygen from the cathode and fuel from a fuel supply, the at least one oxidizer configured to output a partially-oxidized fuel comprising carbon monoxide, carbon dioxide, and hydrogen.

2. The system according to claim 1, further comprising a heat source configured to generate heat and exhaust.

3. The system according to claim 2, wherein the heat source is a fired heater.

4. The system according to claim 2, further comprising a reformer configured to receive fuel from the fuel supply and at least one of steam or water.

5. The system according to claim 4, wherein the reformer is configured to transfer heat from the heat source to the fuel and to the at least one of steam or water; and
   wherein the reformer is configured to at least partially reform the fuel and at least one of steam or water.

6. The system according to claim 4, further comprising a pre-heater configured to pre-heat the fuel before the fuel is received in the reformer.

7. The system according to claim 6, wherein the pre-heater is configured to pre-heat the fuel using waste heat.

8. The system according to claim 2, further comprising an air supply heat exchanger configured to transfer heat generated by the heat source to air received by the heat source.

9. The system according to claim 2, wherein the heat source is configured to vent exhaust out of the system.

10. A system for producing at least one of hydrogen or carbon monoxide, comprising:
    at least one fuel cell comprising:
       an anode and a cathode separated by an electrolyte matrix;
       a power supply for applying a reverse voltage to the at least one fuel cell to operate the fuel cell in reverse as an electrolyzer; and
       a reforming cell configured to receive fuel from a fuel supply and at least one of steam or water, the reforming cell configured to output a partially-reformed fuel;
    wherein the reforming cell is configured to feed the partially-reformed fuel to the anode and the cathode;
    wherein the anode is configured to receive the partially-reformed fuel and output a gas comprising hydrogen;
    wherein the cathode is configured to receive and at least partially oxidize at least one of the fuel from the fuel supply or the partially-reformed fuel; and
    wherein the cathode is configured to output carbon monoxide, hydrogen, and carbon dioxide.

11. The system according to claim 10, wherein the cathode further comprises a catalyst configured to partially oxidize the partially-reformed fuel.

12. The system according to claim 10, wherein the cathode is configured to output primarily carbon monoxide.

13. The system according to claim 10, further comprising a heat source configured to generate heat and exhaust.

14. The system according to claim 13, further comprising a first heat exchanger configured to transfer heat from the heat source to fuel from the fuel supply and at least one of steam or water.

15. The system according to claim 13, wherein the heat source is a fired heater.

16. The system according to claim 13, wherein the heat source is configured to vent exhaust out of the system.

17. The system according to claim 10, further comprising a pre-reformer configured to receive fuel from the fuel supply and at least one of steam or water.

18. The system according to claim 10, further comprising a pre-heater configured to pre-heat the fuel before the fuel is received in the reforming cell.

19. The system according to claim 18, wherein the pre-heater is configured to pre-heat the fuel using waste heat.

20. The system according to claim 10, wherein the fuel from the fuel supply is methane.

21. A system for producing hydrogen, comprising:
    at least one fuel cell comprising:
       an anode and a cathode separated by an electrolyte matrix; and
       a power supply for applying a reverse voltage to the at least one fuel cell to operate the fuel cell in reverse as an electrolyzer;
    an oxidizer configured to receive fuel from a fuel supply and at least one of steam or water, the oxidizer configured to output a partially-reformed fuel;
    wherein the anode is configured to receive the partially-reformed fuel from the oxidizer and to output hydrogen; and
    wherein the cathode is configured to output carbon dioxide and oxygen to the oxidizer.

22. The system according to claim 21, further comprising a heater configured to heat the fuel and at least one of steam or water.

23. The system according to claim 22, wherein the heater is configured to receive a portion of the partially-reformed fuel output by the oxidizer.

24. The system according to claim 23, wherein the heater is configured to combust the partially-reformed fuel to generate heat.

25. The system according to claim 24, wherein the heater is configured to vent exhaust out of the system.

26. The system according to claim 21, wherein the fuel is diesel fuel or JP8.

27. The system according to claim 22, further comprising a pre-heater configured to pre-heat the fuel and the at least one of steam or water before the fuel and the at least one of steam or water are received in the heater.

28. The system according to claim 27, wherein the pre-heater is configured to pre-heat the fuel using waste heat.

* * * * *